(12) United States Patent
Sakai et al.

(10) Patent No.: US 6,563,429 B2
(45) Date of Patent: May 13, 2003

(54) WEIGHT DETECTOR FOR VEHICLE SEAT

(75) Inventors: Morio Sakai, Toyota (JP); Koji Aoki, Nagoya (JP); Kazunori Sakamoto, Chiryu (JP); Osamu Fujimoto, Nisshin (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/961,247

(22) Filed: Sep. 25, 2001

(65) Prior Publication Data

US 2002/0041236 A1 Apr. 11, 2002

(30) Foreign Application Priority Data

Sep. 25, 2000 (JP) ........................................ 2000-290700

(51) Int. Cl.[7] ............................................... G08B 21/00
(52) U.S. Cl. ........................ 340/667; 340/665; 340/666; 340/668
(58) Field of Search ................................ 340/667, 665, 340/666, 540, 668; 702/173

(56) References Cited

U.S. PATENT DOCUMENTS

| | | | | |
|---|---|---|---|---|
| 6,069,325 A | * | 5/2000 | Aoki | 340/667 |
| 6,092,838 A | * | 7/2000 | Walker | 280/735 |
| 6,099,032 A | * | 8/2000 | Cuddihy et al. | 280/735 |
| 6,201,480 B1 | * | 3/2001 | Aoki | 340/667 |
| 6,323,443 B1 | * | 11/2001 | Aoki | 340/667 |
| 6,356,200 B1 | * | 3/2002 | Hamada et al. | 340/667 |
| 6,397,688 B1 | * | 6/2002 | Sakamoto et al. | 73/862.637 |

FOREIGN PATENT DOCUMENTS

JP          11-304579 A      11/1999

* cited by examiner

*Primary Examiner*—Benjamin C. Lee
*Assistant Examiner*—Daniel Previl
(74) *Attorney, Agent, or Firm*—Burns, Doane, Swecker & Mathis, LLP

(57) ABSTRACT

A weight detector for detecting the weight of a passenger seated on a vehicle seat includes a first load sensor and a second load sensor provided on opposite sides of a rear portion of the vehicle seat. Each of the first and second load sensors has a predetermined detection range. The weight detector further includes a third load sensor and a fourth load sensor provided on opposite sides of a front portion of the vehicle seat. Each of the third and fourth load sensors has a predetermined detection range. If a detection value based on a load acquired by one of the first through fourth load sensors exceeds its detection range, the weight detector uses an old value that was determined under proper condition. Otherwise, the weight detector determines the size of the passenger based on the currently detected values.

10 Claims, 5 Drawing Sheets

WEIGHT DETECTOR FOR VEHICLE SEAT

BACKGROUND OF THE INVENTION

The present invention relates to a weight detector installed in vehicle seats.

Vehicles are equipped with airbags to protect passengers. A seat provided with an airbag includes a weight detector. The weight detector is used to detect whether a passenger is sitting on the associated seat and to adjust the amount of gas generated in order to inflate the airbag in accordance with the weight of the seated passenger. Japanese Unexamined Patent Publication No. 11-304579 describes an example of a weight detector.

A typical weight detector includes load sensors attached to a lower portion of a vehicle seat. The load sensors are located in the four corners of the seat to detect the weight of a passenger seated on the seat. Load is applied to and detected by each load sensor. The sum of the loads detected by the sensors represents the weight of the seated passenger. The detection is used to determine whether a passenger is sitting on the seat and whether the seated passenger is an adult or a child.

It is preferred that the sum of the loads detected by the load sensors does not fluctuate regardless of the state of the vehicle. In other words, it is preferred that the sum be a constant value even when the state of the vehicle changes the load detected by each sensor.

Figure 6A:
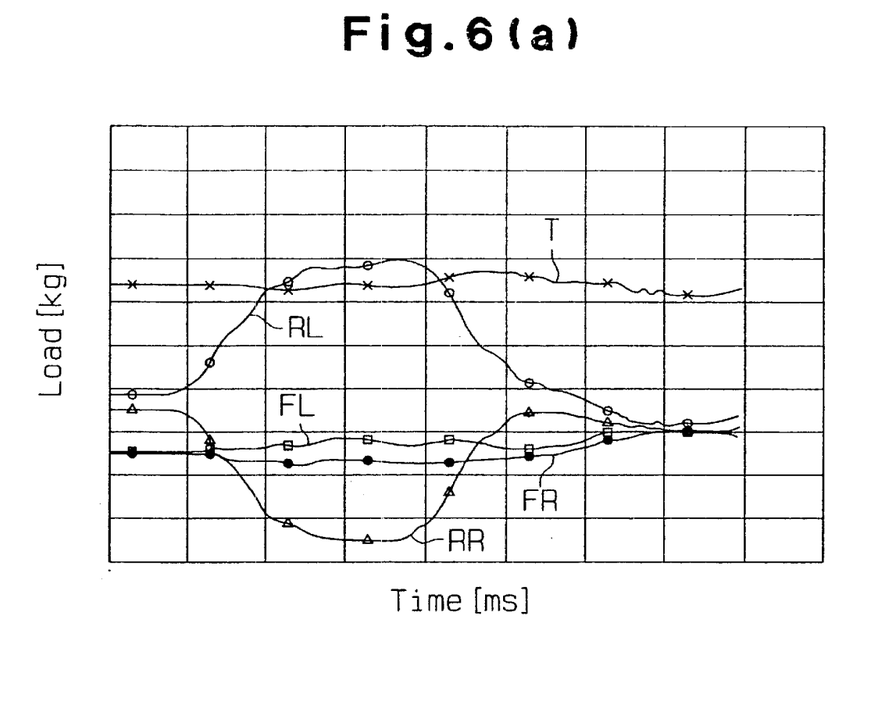

FIG. 6(a) is a graph illustrating the optimal load fluctuation characteristic of each load sensor when the vehicle is turned right. The load detected by the load sensor located at the rear left side of the seat increases when the vehicle is turned right and decreases as the vehicle is straightened, as shown by curve RL. The load detected by the load sensor located at the rear right side of the seat decreases as the vehicle is turned right and increases as the vehicle is straightened, as shown by curve RR.

The load detected by the load sensor located at the front left side of the seat substantially remains constant regardless of whether the vehicle is turned right, as shown by curve FL. The load detected by the load sensor located at the front right side of the seat also substantially remains constant regardless of whether the vehicle is turned right, as shown by curve FR.

The sum of the loads detected by the load sensors, which are respectively represented by the curves RL, RR, FL, FR, remains constant, as shown by curve T. That is, the sum is constant because even when the detected loads respectively shown by the curves RL, RR greatly fluctuate, the curves RL, RR offset one another.

Accordingly, the weight detection is accurate regardless of how the vehicle is steered as long as the load sum is based on values obtained by load sensors having characteristics that enable the detection represented by the curves RL, RR, FL, FR as shown in FIG. 6(a).

However, each load sensor has a predetermined detection range. Thus, when the load applied to the sensor is not included in the detection range, the sum of the detected loads fluctuates.

Figure 6B:
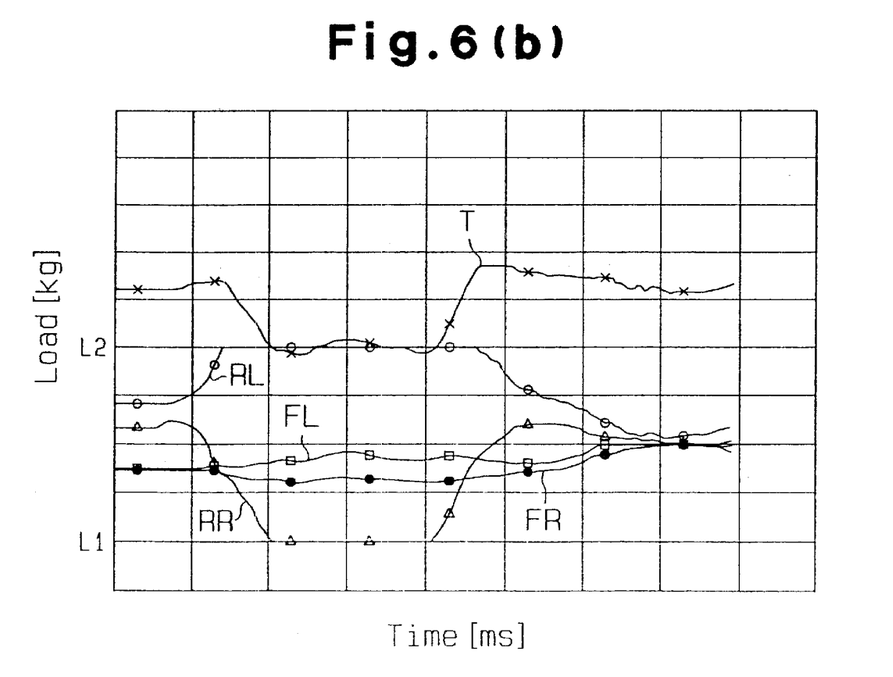

FIG. 6(b) is a graph illustrating load fluctuation characteristics of load sensors having a limited detection range when the vehicle is turned right. The load sensors, which are arranged at the four corners of the seat, detect loads in the range of minimum value L1 to maximum value L2 (e.g., −10 kg to 50 kg).

In FIG. 6(b), as shown by curve RL, the load detected by the load sensor located at the rear left side of the seat increases until reaching the maximum value L2 when the vehicle is turned right. The detected load remains at the maximum value L2 until the actual load decreases to the maximum value L2 as the vehicle is straightened.

As shown by curve RR, the load detected by the load sensor located at the rear right side of the seat decreases until reaching the minimum value L1 when the vehicle is turned right. The detected load remains at the minimum value L1 until the actual load increases to the minimum value L1 as the vehicle is straightened.

The load detected by the load sensors located at the front left and right sides of the seat remains constant even when the vehicle is turned right, as shown by curves FL, FR.

When using the load sensors that have the characteristics shown by the curves RL, RR, FL, FR, the curve T representing the sum of the detected loads starts to fluctuate significantly when the load applied to the left and right rear sensors goes out of the detection range. In other words, the sum fluctuates when the vehicle is turned in a manner unrelated to the passenger's weight.

As described above, when employing load sensors having a limited detection range to detect the passenger's weight, accurate detection may not be performed depending on the running state of the vehicle. Generally, inexpensive load sensors have narrower load detection ranges and may thus fail to give accurate readings when the vehicle state changes. In other words, the employment of inexpensive sensors having narrow load detection ranges may hinder accurate load detection.

SUMMARY OF THE INVENTION

It is an object of the present invention to provide a vehicle seat weight detector that accurately detects the weight of a passenger regardless of the state of the vehicle in an inexpensive manner.

To achieve the above object, the present invention provides a weight detector for a vehicle seat for executing detection of the weight of a passenger seated on the vehicle seat. The weight detector comprises a first load sensor and a second load sensor provided respectively on opposite sides of a rear portion of the vehicle seat. Each of the first and second sensors has a predetermined detection range. The weight detector further includes a third load sensor and a fourth load sensor provided respectively on opposite sides of a front portion of the vehicle seat. Each of the third and fourth sensors has a predetermined detection range. If one of first through fourth detection values detected respectively by the first through fourth load sensors exceeds the corresponding detection range, the weight detector uses an old weight determination that was determined when the detection values were within their corresponding detection ranges.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(*a*) is a front view showing a front sensor bracket;

FIG. 3(*b*) is a front view showing a rear sensor bracket;

FIG. 6(*a*) is a graph showing the characteristics of detection values acquired through load sensors; and FIG. 6(*b*) is a graph showing the characteristics of detection values acquired through load sensors.

DETAILED DESCRIPTION OF THE PREFERRED EMBODIMENTS

An embodiment according to the present invention will now be described with references to FIGS. 1 through 5.

Figure 1:
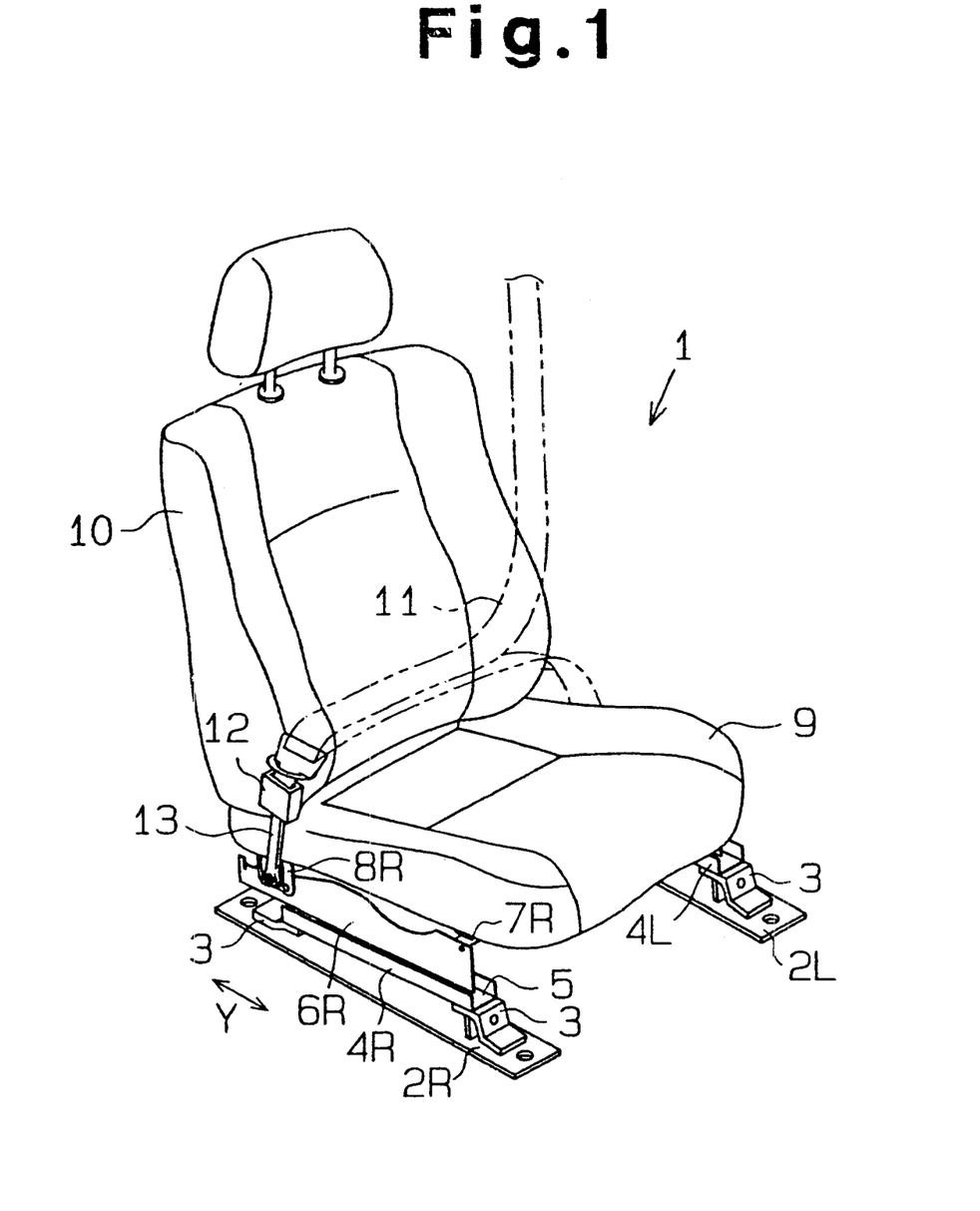
FIG. 1 is a perspective view showing a vehicle seat according to one embodiment of the present invention.

FIG. 1 is a perspective view of a seat main body of the vehicle seat according to the present embodiment. The seat main body 1 is a passenger seat adjacent to a driver's seat. In this embodiment, the seat main body 1 is located at the left side of the driver's seat in a forward running direction. A pair of support frames 2R, 2L, right and left, respectively, are secured to a vehicle floor (not shown) such that the right support frame 2R and the left support frame 2L extend in frontward and rearward directions (in the direction of arrow Y in FIG. 1).

A pair of brackets 3, front and rear, are fastened to the upper sides of each support frame 2R, 2L. Lower rails 4R, 4L are respectively fixed to the brackets 3 along the support frames 2P, 2L. Each lower rail 4R, 4L has a U-shaped cross-section. A slide groove 5, which extends frontward and rearward, is defined in the upper surface of each lower rail 4R, 4L.

Figure 2:
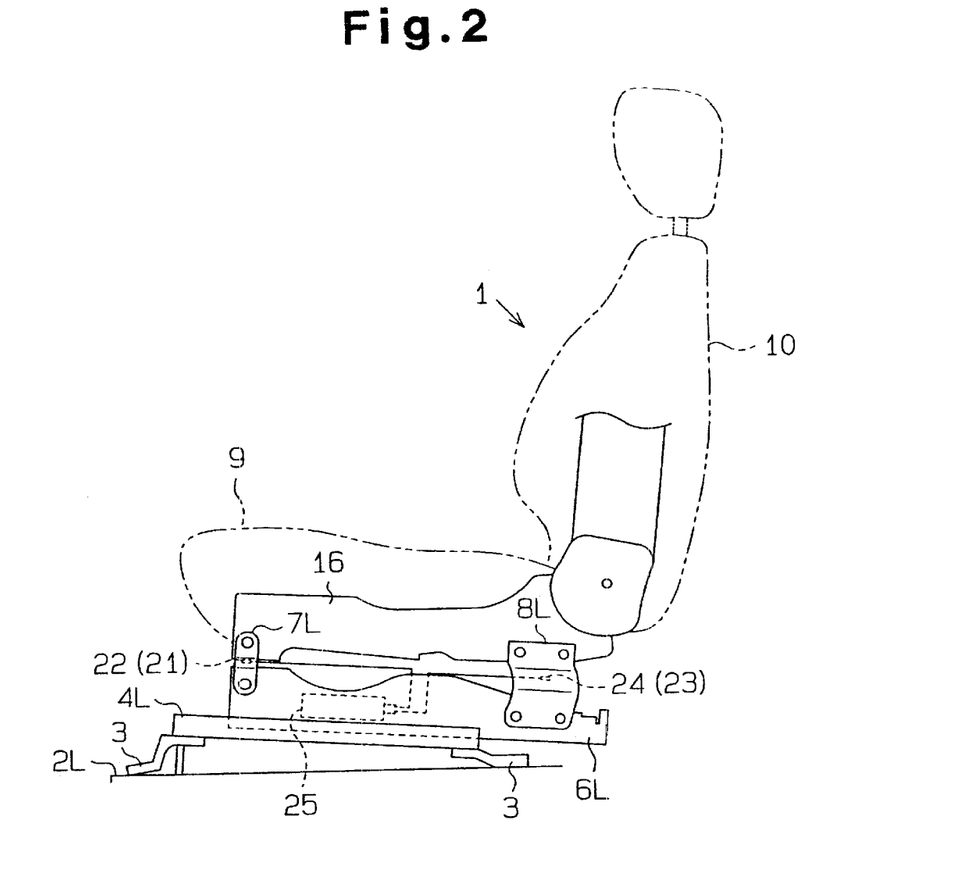
FIG. 2 is a side view of the vehicle seat of FIG. 1.

Upper rails 6R, 6L are respectively received in the slide grooves 5 and can slide along the corresponding slide grooves 5. As shown in FIG. 2, a lower arm 16 is connected to the upper rail 6R by a front sensor bracket 7R and a rear sensor bracket 8R, and another lower arm 16 is connected to the upper rail 6L by a front sensor bracket 7L and a rear sensor bracket 8L. The lower arms 16 supports a seat cushion 9 and a seat back 10 of the seat main body 1.

Figures 3A, 3B:
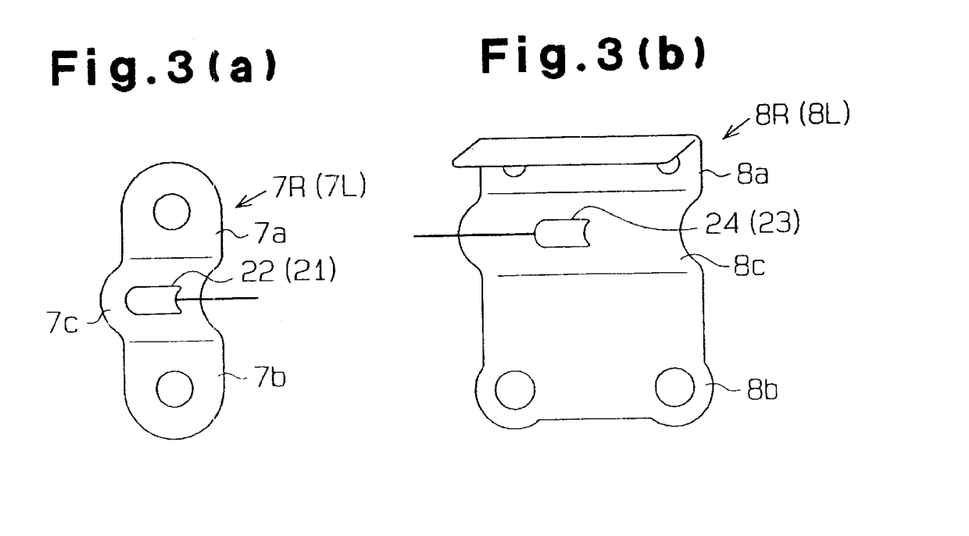

As shown in FIG. 3(*a*), the upper end of each front sensor bracket 7R, 7L defines an upper fastening portion 7*a*, and the lower end of it defines a lower fastening portion 7*b*. A section between the upper and lower fastening portions 7*a*, 7*b* is bent to serve as a deformation portion 7*c*. The upper fastening portions 7*a* of the front sensor brackets 7R, 7L are connected to front portions of the associated lower arms 16. The lower fastening portions 7*b* of the front sensor brackets 7R, 7L are connected to front portions of the upper rails 6R, 6L, respectively. A right front load sensor 21, or a third load sensor, is fixed to the deformation portion 7*c* of the right front sensor bracket 7R, and a left front load sensor 22, or a fourth load sensor, is fixed to the deformation portion 7*c* of the left front sensor bracket 7L. The right front load sensor 21 and the left front load sensor 22 each include a strain detecting element, such as a strain gauge, which electrically detects the amount of deformation of the deformation portion 7*c* in accordance with a load applied to the seat cushion 9. Each front sensor 21, 22 has a fixed detection range of load. In the present embodiment, each sensor 21, 22 detects a load in the range of minimum value L1 to maximum L2 (e.g., −10 kg to 50 kg), as shown in FIG. 6(*b*).

As FIG. 3(*b*) shows, the upper end of each rear sensor bracket SR, SL defines an upper fastening portion 8*a*, and the lower end of it defines a lower fastening portion 8*b*. The section between the upper and lower fastening portions 8*a*, 8*b* is bent to serve as a deformation portion 8*c*. The upper fastening portions 8*a* of the rear sensor brackets 8R, 8L are connected to rear portions of the associated lower arms 16, and the lower fastening portions 8*b* of the rear sensor brackets 8R, 8L are connected to rear portions of the upper rails 6R, 6L, respectively. A right rear load sensor 23, or a first load sensor, is fixed to the deformation portion 8*c* of the right rear sensor bracket 8R, and a left rear load sensor 24, or a second load sensor, is fixed to the deformation portion 8*c* of the left rear sensor bracket 8L. Like the right front load sensor 21 and the left front load sensor 22, the right rear load sensor 23 and the left rear load sensor 24 each include a strain detecting element, such as a strain gauge, which electrically detects the amount of deformation of each deformation portion 8*c* in accordance with a load applied to the seat cushion 9. Each rear sensor 23, 24 has a fixed detection range of load. In the present embodiment, each rear sensor detects a load in the range of minimum value L1 to maximum value L2 (e.g., −10 kg to 50 kg).

An anchor bracket 13 for a belt anchor 12, to which a seat belt 11 connected, is secured to one of the upper rails (see the left side of FIG. 1).

Figure 4:
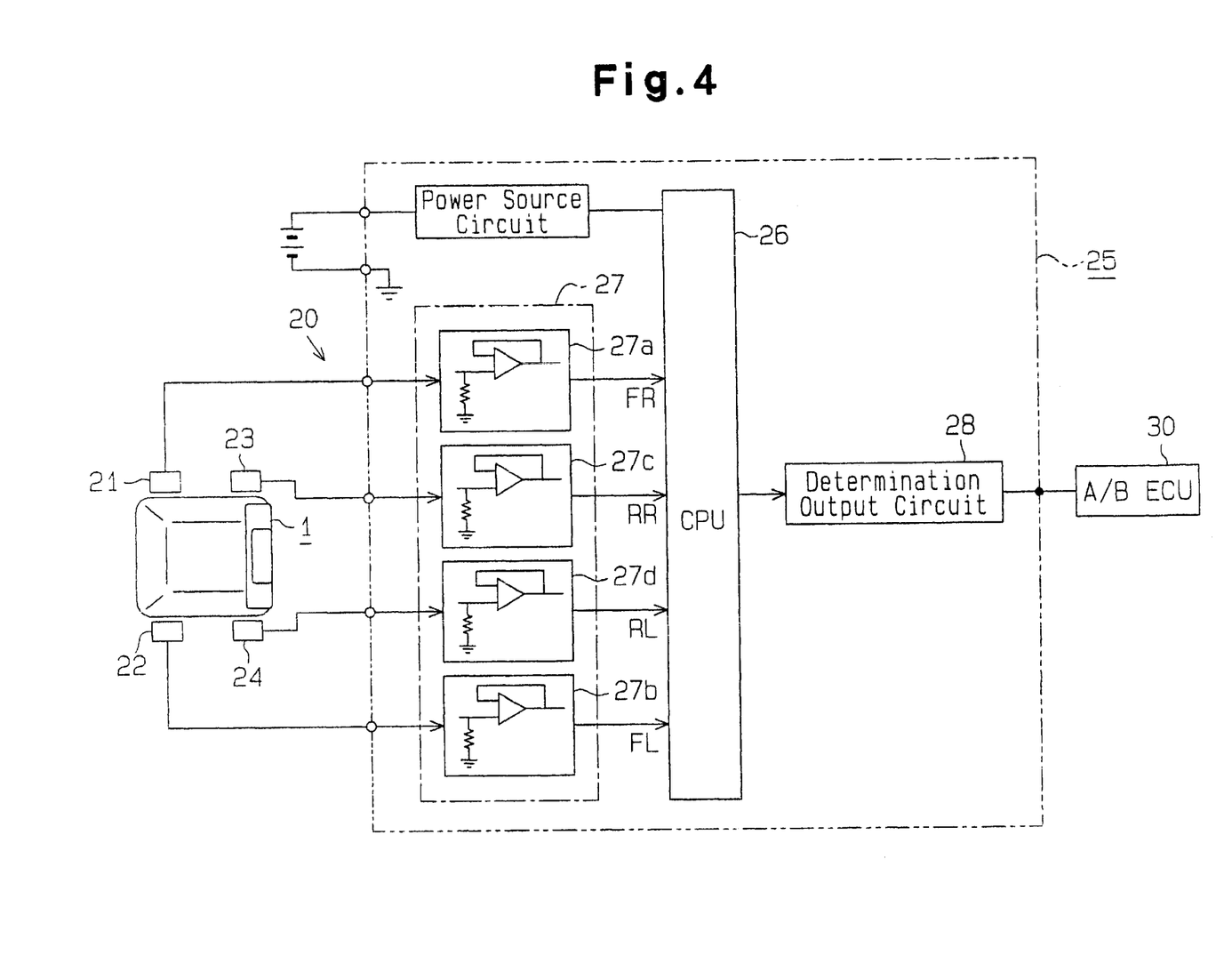
FIG. 4 is a block diagram showing the electrical structure of a weight detector according to the present embodiment of the present invention.

FIG. 4 is a block diagram showing an electrical structure of a weight detector 20 installed in a vehicle seat. The weight detector 20 includes the load sensors 21 through 24 and an electronic control unit (hereinafter referred to as ECU) 25.

The ECU 25 includes a central processing unit (hereinafter referred to as CPU) 26, a signal input circuit 27, a determination output circuit 28.

The signal input circuit 27 includes active filters 27*a*, 27*b*, 27*c*, 27*d*, which are provided in association with the right front load sensor 21, the left front load sensor 22, the right rear load sensor 23, and the left rear load sensor 24. Load signals, which are supplied from the corresponding load sensors 21 through 24, are input to the CPU 26 via the corresponding active filters 27*a* through 27*d*. Each of the active filters 27*a* through 27*d* is a known low-pass filter. The low-pass filter is a combination of a passive element, which includes a capacitor and a resistor, and an active element, which includes an amplifier.

The active filters 27*a* through 27*d* allow passage of only low-frequency signals among load signals transmitted from the associated load sensors 21 through 24, and does not allow passage of other signals.

A first detection value RR is computed based on the load signal transmitted from the right rear load sensor 23 through the active filter 27*c*, and a second detection value RL is computed based on the load signal transmitted from the left rear load sensor 24 through the active filter 27*d*. Likewise, a third detection value FR is computed based on the load signal transmitted from the right front load sensor 21 through the active filter 27*a*, and a fourth detection value FL is detected based on the load signal transmitted from the left front load sensor 22 through the active filter 27*b*.

Following a control program and using initial data stored in advance, the CPU 26 executes various computing processes and performs various determinations based on the results of the computations. The CPU outputs the results of the determinations to an electronic control unit of an air bag device (hereinafter referred to as an A/B ECU) 30 through the determination output circuit 28. Based on the result of the determinations, the A/B ECU 30 controls the actuation of an air bag device. The detection range (minimum value L1 to maximum value L2) of each sensor, which is used as initial data, is prestored in a memory of the CPU 26.

Figure 5:
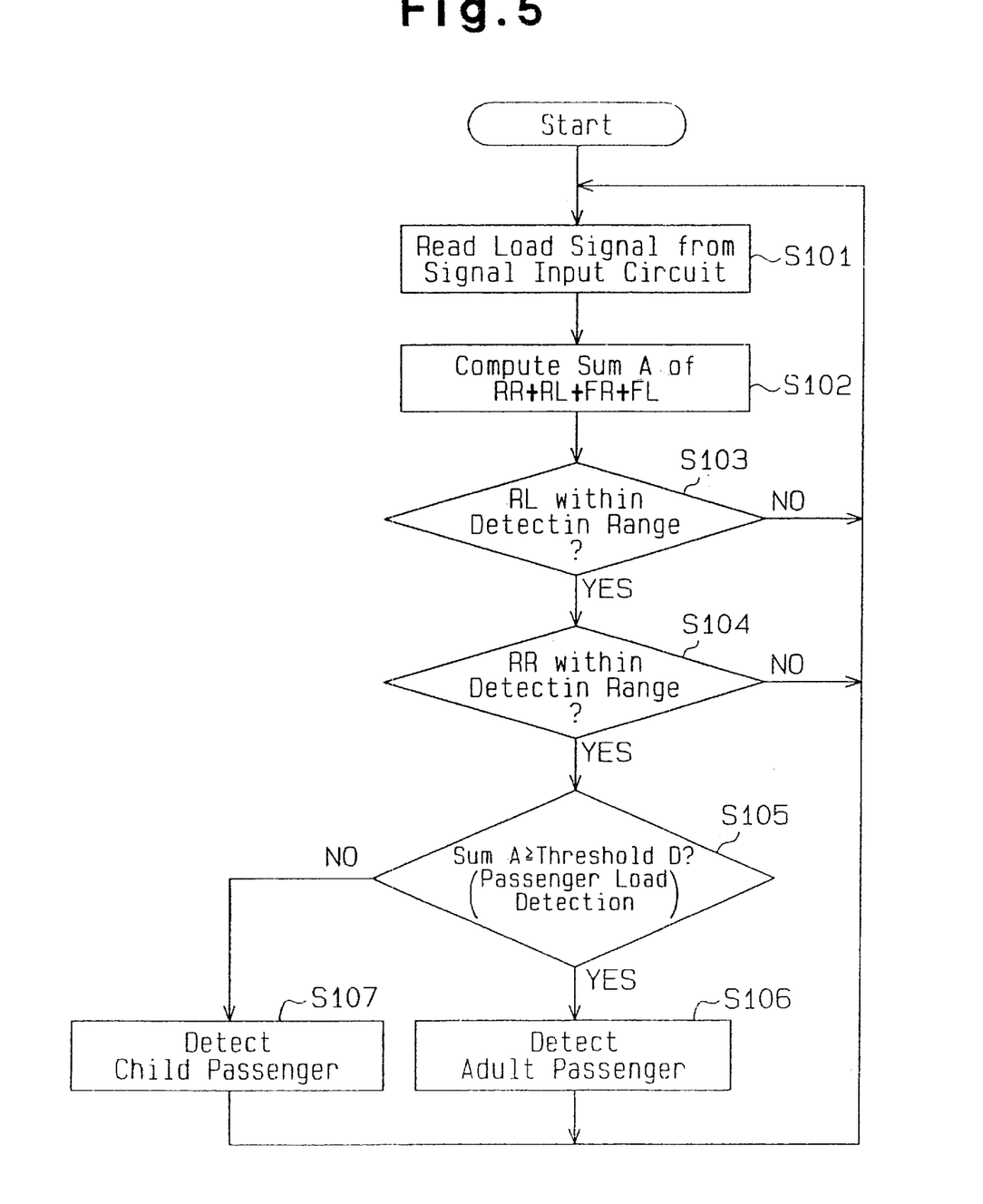
FIG. 5 is a flowchart illustrating a passenger load detection routine according to the embodiment of the present invention.

A routine for detecting a passenger load, or passenger's weight, based on the detection values RR, RL, FR, FL will now be described with reference to a flow chart shown in FIG. 5. The passenger load is detected in real time during running of the vehicle.

In the passenger load routine according to the present embodiment, the CPU 26 reads in step S101 load signals of the sensors, which have been filtered by the signal input circuit 27. Following the control program and the initial data, both of which are stored in advance, the CPU 26 computes in step S102 the first through fourth detection values RR, PL, FR, and FL, respectively, based on the load signals read from the sensor signal input circuit 27. The CPU 26 stores the computed detection values RR, RL, FR, and FL into the memory. Additionally, the CPU 26 computes the sum A of the detection values RR, RL, FR, FL, and stores the sum A, or the sum of the loads, into the memory.

In the processes of steps S103 and S104, the CPU 26 determines whether the vehicle is turning or not.

Specifically, at step S103, the CPU 26 determines whether or not the computed second detection value RL is within the detection range (minimum value L1 to maximum value L2) of the left rear load sensor 24. Likewise, at step S104, the CPU 26 determines whether or not the computed first detection value RR is within the detection range (minimum value L1 to maximum L2) of the right rear load sensor 23.

That is, at step 103, the CPU 26 determines that the vehicle is turning right when the second detection value RL exceeds the maximum value L2, that the vehicle is turning left when the value RL is less than the minimum value L1, and that the vehicle is not turning when the value RL is within the range of L1 to L2. In other words, when the second detection value RL exceeds the maximum value L2 and when the value RL is less than the minimum value L1, the CPU 26 cannot detect a load accurately by the left rear load sensor 24. As a result, the CPU 26 fails to acquire an accurate sum A.

Similarly, at step S104, the CPU 26 determines that the vehicle is turning left when the first detection value RR exceeds the maximum value L2, that the vehicle is turning right when the value RR is less than the minimum value L1, and that the vehicle is not turning when the value is within the range of L1 to L2. In other words, when the first detection value RR exceeds the maximum value L2 and when the value is less than the minimum value L1, the CPU 26 cannot detect a load accurately by the right rear load sensor 23. As a result, the CPU 26 fails to acquire an accurate sum A.

When the vehicle is not turning, for instance, when the vehicle is running straight at a constant speed, the first detection value RR and the second detection value RL both remain in the detection range (L1 to L2). This permits the CPU 26 to proceed to step S105.

In step S105, the CPU 26 determines from the computed sum A whether a passenger is sitting on the seat and whether the seated passenger is an adult or a child. In the present embodiment, the sum A is compared with a predetermined threshold. When the sum A is greater than or equal to the threshold, the CPU 26 determines that the seated passenger is an adult, (step S106). When the sum A is less than the predetermined threshold, the CPU 26 determines that the passenger is a child, (step S107). While storing the result of the current cycle of the passenger load detection routine in the memory until updating the result, the CPU 26 outputs the result to the A/B ECU 30 via the determination output circuit 28. The predetermined threshold is set to a value (e.g., 35 kg) for determining whether a passenger is an adult or a child, and is prestored in the memory of the CPU 26.

After the processes of steps S106 and 107, the CPU 26 returns the flow to step S101 to initiate the subsequent cycle of the routine.

On the other hand, if either the first detection value RR or the second detection value RL exceeds the detection range of L1 to L2, or if the determination is NO in step 103 or 104, when the vehicle is turning, the CPU 26 returns to step S101 to initiate the subsequent cycle of the passenger load detection routine. In this case, the CPU 26 outputs the result of the previous cycle of the routine to the A/B ECU 30 via the determination output circuit 28 in order to use it as the result of the current cycle of the routine.

The weight detector according to the present embodiment has the advantages described below.

In the present embodiment, if the first detection value RR or the second detection value RL exceeds the detection range, the CPU 26 does not determine whether or not the sum A of the detection values RR, RL, FR, FL is greater than or equal to the predetermined threshold. That is, the CPU 26 stops the routine.

Accordingly, when the vehicle is turning, the passenger load detection is not executed using an inaccurate sum A of the detection values RR, RL, FR, and FL, which results when the first detection value RR or the second detection value RL exceeds the detection range. This improves the accuracy of the weight detector 20.

In the present embodiment, when the vehicle is running in a normal state, for example, when the vehicle is running straight at a constant speed while the first detection value RR and the second detection value RL remain within the detection range, the CPU 26 outputs the current result of the passenger load detection routine. On the other hand, when the vehicle is turning and when the first detection value RR or the second detection value RL exceeds the detection range, the CPU 26 stops the passenger load detection routine. Instead, the CPU 26 outputs the result of the previous cycle of the routine, which was acquired when the vehicle was running in the normal state.

Thus, if the sum A of the detection values RR, RL, FR, FL is not expected to be accurate due to the fact that the first detection value RR or second detection value RL exceeds the detection range during the turning of the vehicle, the result of the previous cycle of the routine, which is more accurate, is used. This enables the CPU 26 to output an accurate result regardless of the running state of the vehicle. Accordingly, the passenger load detection accuracy improves.

This eliminates the need for a load sensor that is provided with a wide detection range to prevent, regardless of how the vehicle is being steered, the first detection value RR and the second detection value RL from exceeding their detection ranges. This reduces the cost of the weight detector 20.

In the present embodiment, the passenger load detection is executed in real time. Accordingly, reliable passenger detection is possible regardless of whether the first detection value RL or the second detection value RR exceeds the detection range during the turning of the vehicle.

The present embodiment is considered illustrative and not restrictive, and the present invention may be embodied in the following forms.

The shapes of the front sensor bracket 7 and rear sensor bracket 8 employed in the present embodiment are examples, but may be altered as long as the brackets 7, 8 are deformed by the weight of a seated passenger.

The positions in which the load sensors 21 through 24 (front sensor brackets 7 and the rear sensor brackets 8) employed in the illustrated embodiment are secured are exemplary. The sensors 21 through 24 can be secured in any position as long as the weight of a seated passenger is detected.

Additional steps can be performed between steps S102 and S105 to determine whether or not the third detection value FR and the fourth detection value FL are within their detection ranges. In addition to the advantages of the illustrated embodiment, this provides another advantage in that inaccurate passenger load detection is prevented even when the vehicle is not turning.

In the illustrated embodiment, step 103 is provided for determining whether or not the second detection value RL is within the detection range and step 104 is provided for determining whether or not the first detection value RR is within the detection range. However, the order of steps 103, 104 may be reversed. This variation has the same advantages as those obtained in the illustrated embodiment.

The predetermined threshold in the present embodiment is 35 kg. However, the threshold may be set to any value, for example a value in the range of 20 to 40 kg, as long as the value is reliable to determine whether a seated passenger is an adult or a child. This variation also provides the same advantages as those of the illustrated embodiment.

The detection range of the right front load sensor 21 and left front load sensor 22 can be narrower than the detection range of the right rear load sensor 23 and left rear load sensor 24. This provides, in addition to the advantages of the illustrated embodiment, the advantage that the cost of the weight detector 20 further decreases.

Either one of steps 103, 104 may be omitted. Because the right rear load sensor 23 and the left rear load sensor 24 are symmetric, detecting that the first detection value RR exceeds the detection range on the positive side (on the side of the maximum value L2) indicates that the second detection value RL exceeds the detection range on the negative side (on the side of the minimum value L1). Therefore, obtaining only one of the detection values RR, RL by a load sensor 23, 24 is sufficient to determine whether or not the detection values RR, RL fall within the detection range. This variation has the same advantages as those of the illustrated embodiment.

After steps S103, 104 for determining whether or not the associated detection values RL, RR are beyond the detection range, it may be determined at step S105 whether or not the sum A of the detection values RR, RL, FR, FL is less than the predetermined threshold.

The step for computing the sum A of the detection values RR, RL, FR, FL can come after the step for determining whether or not the detection values RR, RL are within the detection range. In this case, the CPU 26 may inhibit the computation of the sum A upon detecting that the first detection value RR or second detection value RL exceeds the detection range and may execute the passenger load detection based on the sum A acquired in the most recent cycle, in which the detection values RR, RL were within the detection range. This provides substantially the same advantages as illustrated embodiment.

In the illustrated embodiment, the seat adjacent to the driver's seat is located at the left side of the vehicle. However, the seat can also be located at the right side of the vehicle.

The present embodiment and examples are to be considered as illustrative and not restrictive, and the invention is not to be limited to the details given herein, but may be embodied within the scope and equivalence of the appended claims.

What is claimed is:

1. A weight detector for executing detection of the weight of a passenger seated on a vehicle seat, the weight detector comprising:

a first load sensor and a second load sensor provided respectively on opposite sides of a rear portion of the vehicle seat, wherein each of the first and second sensors has a predetermined detection range; and a third load sensor and a fourth load sensor provided respectively on opposite sides of a front portion of the vehicle seat, wherein each of the third and fourth sensors has a predetermined detection range, wherein if one of first through fourth detection values detected respectively by the first through fourth load sensors exceeds the corresponding detection range, the weight detector uses an old weight determination that was determined when the detection values were within their corresponding detection ranges.

2. The weight detector according to claim 1, wherein if the first through fourth detection values detected respectively by the first through fourth load sensors are within the corresponding detection range, the weight detector determines the weight of the passenger based on the currently detected values.

3. The weight detector according to claim 1, wherein if the first or second detection value exceeds the detection range of the associated load sensor, the old weight determination is used.

4. The weight detector according to claim 1, wherein the detection of the weight of the seated passenger is executed by comparing of a sum of the first through fourth detection values with a predetermined threshold.

5. The weight detector according to claim 4, wherein when the sum of the first through fourth detection values is greater than or equal to the threshold, it is determined that the passenger is an adult, and when the sum is less than the threshold, it is determined that the passenger is a child.

6. A weight detector for executing detection of the weight of a passenger seated on a vehicle seat, the weight detector comprising:

a first load sensor and a second load sensor provided respectively on opposite sides of the vehicle seat, wherein leach of the first and second sensors has a predetermined detection range, wherein if one of first and second detection values detected respectively by the first and second load sensors exceeds the corresponding detection range, the weight detector uses an old weight determination that was determined when the detection values were within their corresponding detection ranges.

7. The weight detector according to claim 6, wherein if the first and second detection values detected respectively by the first and second load sensors are within the corresponding detection range, the weight detector determines the weight of the passenger based on the currently detected values.

8. The weight detector according to claim 6, wherein the detection of the weight of the seated passenger is executed by comparing a sum of the first and second detection values with a predetermined threshold.

9. The weight detector according to claim 8, wherein when the sum of the first and second detection values is greater than or equal to the threshold, it is determined that the passenger is an adult, and when the sum is less than the threshold, it is determined that the passenger is a child.

10. A method for detecting the weight of a passenger seated on a vehicle seat, the method comprising the steps of:

acquiring first and second detection values based on loads, wherein the first and second detection values are respectively detected by a first load sensor and a second load sensor provided respectively on opposite sides of a rear portion of the vehicle seat;

acquiring third and fourth detection values based on loads, wherein the third and fourth detection values are respectively detected by a third load sensor and a fourth load senor provided respectively on opposite sides of a front portion of the vehicle seat;

determining whether or not each of the first and second detection values acquired based on the first and second load sensors is within an associated predetermined detection range;

using an old detection of the weight of the seated passenger to represent the current size of the passenger if either one of the first and second detection values exceeds the detection range of the associated load sensor; and detecting the weight of the seated passenger based on a sum of the detection values if one of the first and second detection values is within the associated range.

* * * * *